US011751142B2

(12) United States Patent
Zhu et al.

(10) Patent No.: US 11,751,142 B2
(45) Date of Patent: Sep. 5, 2023

(54) SYSTEMS AND METHODS FOR USER EQUIPMENT POWER SAVINGS

(71) Applicant: Verizon Patent and Licensing Inc., Basking Ridge, NJ (US)

(72) Inventors: Lily Zhu, Parsippany, NJ (US); Brian T. Mecum, Aliso Viejo, CA (US); Balaji L. Raghavachari, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 126 days.

(21) Appl. No.: 17/175,771

(22) Filed: Feb. 15, 2021

(65) Prior Publication Data
US 2022/0264469 A1   Aug. 18, 2022

(51) Int. Cl.
*H04W 52/02*   (2009.01)
*H04W 76/27*   (2018.01)

(52) U.S. Cl.
CPC ... *H04W 52/0277* (2013.01); *H04W 52/0235* (2013.01); *H04W 76/27* (2018.02)

(58) Field of Classification Search
CPC ......... H04W 52/0277; H04W 52/0235; H04W 76/27
See application file for complete search history.

(56) References Cited

U.S. PATENT DOCUMENTS

| | | | |
|---|---|---|---|
| 6,697,953 B1 * | 2/2004 | Collins | H04W 52/0267 713/320 |
| 2014/0018085 A1 * | 1/2014 | Young | H04W 76/27 455/450 |
| 2016/0198416 A1 * | 7/2016 | Li | H04W 52/244 370/311 |
| 2019/0215729 A1 * | 7/2019 | Oyman | H04L 65/1016 |
| 2021/0195439 A1 * | 6/2021 | Prabhakar | H04W 24/02 |
| 2021/0329464 A1 * | 10/2021 | Xing | H04W 16/02 |
| 2022/0039009 A1 * | 2/2022 | Iyer | H04W 72/044 |
| 2022/0053426 A1 * | 2/2022 | Ahn | H04W 76/16 |
| 2022/0132625 A1 * | 4/2022 | Mattam | H04W 76/19 |
| 2022/0174560 A1 * | 6/2022 | Wu | H04W 36/0069 |

* cited by examiner

*Primary Examiner* — Mohammed S Chowdhury (57) ABSTRACT

A user equipment (UE) device may include a memory storing instructions and processor configured to execute the instructions to receive a first reconfiguration message from a wireless station of a radio access network to attempt to place the UE device into a first power saving state. The UE device may be further configured to execute the instructions to determine that a battery level is below a first predetermined threshold; transmit, to the wireless station, a second power savings request when it is determined that the battery level is below the predetermined threshold, to place the UE device into a second power saving state; receive a second reconfiguration message from the wireless station based on the second power savings request; and execute adjustments in the second reconfiguration message to place the UE device into the second power saving state.

19 Claims, 8 Drawing Sheets

SYSTEMS AND METHODS FOR USER EQUIPMENT POWER SAVINGS

BACKGROUND INFORMATION

To satisfy the needs and demands of users of mobile communication devices, providers of wireless communication services continue to improve and expand available services as well as networks used to deliver such services. One aspect of such improvements includes the development of next generation core networks as well as options to utilize such core networks. A core network may manage a large number of devices experiencing different conditions. Managing all the different devices and device types associated with different conditions poses various challenges.

Device battery life is one of the most critical factors that impacts user experience and is often a large cause for device returns or dissatisfaction. Current efforts to reduce device to network interface-related power consumption generally relate to a reduction in duty cycle, referred to as discontinuous reception (DRX), control channel monitoring, or limited bandwidth usage (limited data rate). These known battery saving techniques may reduce device performance and may not be acceptable for latency/jitter sensitive services.

DETAILED DESCRIPTION OF EXAMPLE EMBODIMENTS

The following detailed description refers to the accompanying drawings. The same reference numbers in different drawings identify the same or similar elements.

As communication networks and services increase in size, complexity, and number of users, management of the communication networks have become increasingly more complex. One way in which wireless networks are continuing to become more complicated is by incorporating various aspects of next generation networks, such as Fifth Generation (5G) mobile networks, utilizing high frequency bands (e.g., 24 Gigahertz (GHz), 39 GHz, etc.), and/or lower frequency bands such as Sub 6 GHz. 5G New Radio (NR) millimeter (mm) wave technology may provide significant improvements in bandwidth and/or latency over other wireless network technology. Furthermore, coverage and signal quality may be improved using multiple-input and multiple-output (MIMO) adaptive antenna arrays. Additionally, user equipment devices (UE devices or simply UEs) may also include multiple antennas to improve spectral efficiency.

Moreover, improvements in the core networks of 5G wireless networks provide new functionality, such as, for example, network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, configured to implement a different set of requirements and/or priorities, and/or may be associated with a particular Quality of Service (QoS) class (e.g., pertaining to latency/jitter requirements, throughput, packet loss rate, etc.), type of service, and/or particular enterprise customer associated with a set of UE devices.

Examples of network slices that may be implemented in a 5G network may include a default network slice used for sessions not associated with a particular network slice; an enhanced Mobile Broadband (eMBB) network slice for Voice over Internet Protocol (VoIP) telephone calls and/or data sessions for accessing Internet websites; a massive Internet of Things (mIoT) network slice for IoT devices; an Ultra-Reliable Low Latency Communication (URLLC) network slice for URLLC communication, such as medical monitoring devices, autonomous vehicles, industrial automation, etc.; and/or other types of network slices. For example, a Mobile Private Network (MPN) for a particular enterprise may be associated with an MPN network slice.

When a UE device is configured and activated by a wireless network or when a UE device executes a particular application or service, the UE device may be configured to request connection to one or more particular network slices. The allowed slices for the UE device may be configured using a Network Slice Selection Function (NSSF) and stored in a subscription profile, associated with the UE device, in a Unified Data Management (UDM). When the UE device requests a connection to a particular network slice, the UE may send a request to the Access and Mobility Function (AMF) and the AMF may provide a list of allowed network slices to the UE device. The UE device may then request a Packet Data Unit (PDU) connection with one or more of the allowed network slices. Accordingly, slice selection for a UE device may be performed statically during the initial configuration of the UE device. Furthermore, a UE device may connect to multiple network slices even though the UE device may not use each of the multiple network slices at any particular time.

Implementations described herein relate to performing UE device power management based, at least in part, on the one or more network slices to which the UE device is connected. In one implementation, UE devices may be configured to transmit a request for power savings to the network via a message of a first type when in a first battery condition and transmit a request for power savings to the network via a message of a second type when in a second battery condition. In response to the message of the first type, the network may determine appropriate modifications to the connection with the UE device based on the network slice(s) to which the UE device is actively connected. In response to the message of the second type, the network may initiate network connection modifications with the UE device based irrespective of the network slice(s) to which the UE device is actively connected.

Figure 1:
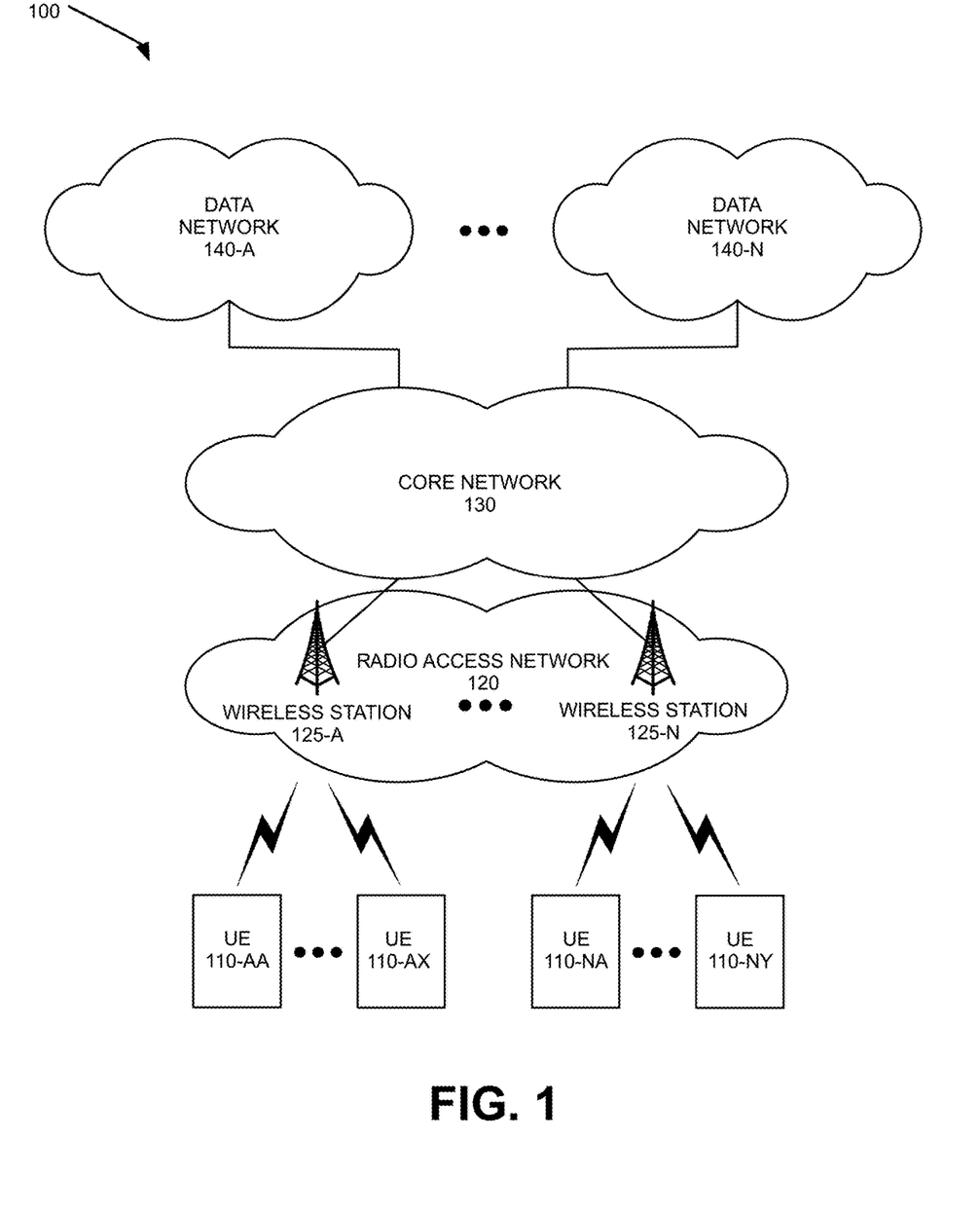
FIG. 1 is a diagram illustrating an environment according to an implementation described herein.

FIG. 1 is a diagram of an exemplary environment 100 in which the systems and/or methods, described herein, may be implemented. As shown in FIG. 1, environment 100 may include UE devices 110-AA to 110-NY (referred to herein collectively as "UEs 110" or "UE devices 110" and individually as "UE 110" or "UE device 110"), a radio access network 120, a core network 130, and data networks 140-A to 140-N.

UE device 110 may include any device with wireless communication functionality (e.g., using a cellular or mobile wireless network). For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), an autonomous or semi-autonomous vehicle, an unmanned aerial drone, and/or another type of electronic device.

Consistent with implementations described herein, UE devices 110 may include logic that supports one or more power saving modes or mode requests. For example, according to an exemplary embodiment, UE devices 110 provides power savings-related information to the wireless network (e.g., radio access network 120, core network 130). The power savings-related information includes capacity and capability restricting information (e.g., cell group limitations, bandwidth limitations, antenna limitations, discontinuous reception (DRX) information, etc.). According to an exemplary implementation, UE devices 110 includes power savings-related information in an information element (IE) that is packaged in an RRC signaling message to affect configuration of the radio connection with radio access network 110.

Radio access network 120 may enable UE devices 110 to connect to core network 130 for mobile telephone service, Short Message Service (SMS) message service, Multimedia Message Service (MMS) message service, Internet access, cloud computing, and/or other types of data services. Radio access network 120 may include wireless stations 125-A to 125-N (referred to herein collectively as "wireless stations 125" and individually as "wireless station 125"). Each wireless station 125 may service a set of UE devices 110. For example, wireless station 125-A may service UE devices 110-AA to 110-AX, etc., and wireless station 125-N may service UE devices 110-NA to 110-NY. In other words, UE devices 110-AA to 110-AX may be located within the geographic area serviced by wireless station 125-A, and other UE devices 110 may be serviced by another wireless station 125.

Wireless station 125 may include a 5G NR wireless station (e.g., a next generation Node B (gNodeB)) or a 4G LTE wireless station (e.g., an evolved Node B (eNodeB)). Wireless station 125 may include one or more radio frequency (RF) transceivers (also referred to as "cells" and/or "wireless station sectors") facing particular directions. For example, wireless station 125 may include three RF transceivers each with respect fields of view.

According to an exemplary embodiment, wireless station 110 includes logic that supports power savings configurations of radio connections with UE devices 110. As described herein, wireless station 110 is configured to receive power savings-related information from UE devices 110 and, in some cases, make decisions relating to appropriate adjustments to the radio connection based on the active network slice(s) to which the UE device 110 is connected. Based on these decisions, messages (e.g., one or more RRC signaling messages) may be transmitted to UE device 110 that define the accommodated power saving adjustments to the active radio connection.

Core network 130 may manage communication sessions for UE devices 110. For example, core network 130 may establish an Internet Protocol (IP) connection between UE device 110 and a particular data network 140. Furthermore, core network 130 may enable UE device 110 to communicate with an application server, and/or another type of device, located in a particular data network 140 using a communication method that may not require the establishment of an IP connection between UE device 110 and data network 140, and use, for example, Data over Non-Access Stratum (DoNAS).

Furthermore, core network 130 may include a 4G LTE core network (e.g., an evolved packet core (EPC) network). In other implementations, core network 130 may include a Code Division Multiple Access (CDMA) network. For example, the CDMA network may include a CDMA enhanced High Rate Packet Data (eHRPD) network (which may provide access to an LTE network).

Data networks 140-A to 140-N (referred to herein collectively as "data networks 140" and individually as "data network 140") may each include a packet data network. A particular data network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular data network 140 may be managed by a communication services provider that also manages core network 130, radio access network 120, and/or particular UE devices 110.

In some implementations, a particular data network 140 may include an IP Multimedia Subsystem (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
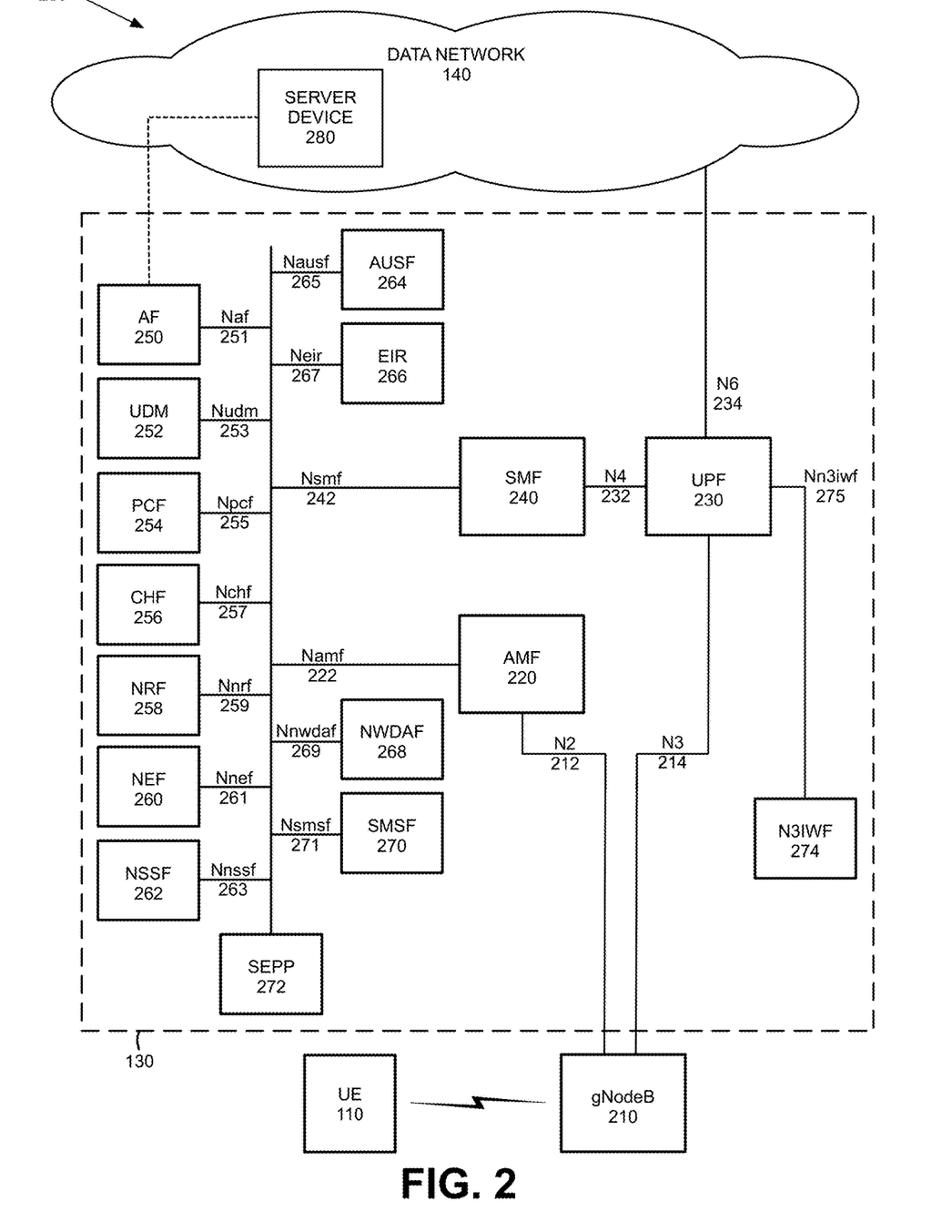
FIG. 2 is a diagram illustrating exemplary components of the core network of FIG. 1 according to an implementation described herein.

FIG. 2 illustrates a system 200 that includes exemplary components of core network 130 in the context of environment 100 according to an implementation described herein. As shown in FIG. 2, system 200 may include UE device 110, gNodeB 210, core network 130, and data network 140.

gNodeB 210 may correspond to wireless station 125 or other components of RAN 120. gNodeB 210 may include one or more devices (e.g., wireless stations) and other components and functionality that enable UE device 110 to wirelessly connect to core network 130 using 5G NR Radio Access Technology (RAT). For example, gNodeB 210 may service one or more cells, with each cell being served by a wireless transceiver with an antenna array configured for mm-wave wireless communication, and/or for lower frequency bands such as Sub 6 GHz. gNodeB 210 may communicate with AMF 220 using an N2 interface 212 and communicate with UPF 230 using an N3 interface 214.

Core network 130 may include an Access and Mobility Function (AMF) 220, a User Plane Function (UPF) 230, a Session Management Function (SMF) 240, an Application Function (AF) 250, a Unified Data Management (UDM) 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

While FIG. 2 depicts a single gNodeB 210, AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, and N3IWF 274 for illustration purposes, in practice, RAN 120 and core network 130 may, and in most cases will, include multiple AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, SMSFs 270, SEPPs 272, and/or N3IWFs 274.

The components depicted in FIG. 2 may be implemented as dedicated hardware components or as virtualized functions implemented on top of a common shared physical infrastructure using SDN. For example, an SDN controller may implement one or more of the components of FIG. 2 using an adapter implementing a VNF virtual machine, a CNF container, an event driven serverless architecture interface, and/or another type of SDN architecture. The common shared physical infrastructure may be implemented using one or more devices 300 described below with reference to FIG. 3 in a cloud computing center associated with core network 130. Additionally, or alternatively, some, or all, of the common shared physical infrastructure may be implemented using one or more devices 300 described below with reference to FIG. 3 using a MEC system associated with wireless stations 125.

AMF 220 may perform registration management, connection management, reachability management, mobility management, lawful intercepts, Short Message Service (SMS) transport between UE device 110 and SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU) point of interconnect to a particular data network 140 (e.g., an IMS network, a MPN, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a node (e.g., gNodeB 210) of Radio Access Network 120, and/or perform other types of user plane processes. UPF 230 may communicate with SMF 240 using an N4 interface 232 and connect to data network 140 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application for influencing traffic routing, an application for accessing NEF 260, an application for interacting with a policy framework for policy control, a third-party application running on server device 280 in a particular data network 140, and/or other types of applications. AF 250 may be accessible via an Naf interface 251, also referred to as an NG5 interface. For example, server device 280 may be configured to communicate with, or to function as, a particular AF 250 (shown as the dotted line connecting AF 250 and server device 280 in FIG. 2).

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may store, in a subscription profile associated with a particular UE device 110, a list of network slices which the particular UE device 110 is allowed to access. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. CHF 256 may perform charging and/or billing functions for core network 130. CHF 256 may be accessible via Nchf interface 257.

NRF 258 may support a service discovery function and maintain profiles of available network function (NF) instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 258 may include one or more transport network Key Performance Indicators (KPIs) associated with the NF instance. NRF 258 may be accessible via an Nnrf interface 259.

NEF 260 may expose capabilities and events to other NFs, including third party NFs, AFs, edge computing NFs, and/or other types of NFs. Furthermore, NEF 260 may secure provisioning of information from external applications to core network 130, translate information between core network 130 and devices/networks external to core network 130, support a Packet Flow Description (PFD) function, and/or perform other types of network exposure functions. NEF 260 may include a slice manager that selects a network slice for a particular UE device 110 based on a request received from a particular AF 250, as described herein. NEF 260 may be accessible via Nnef interface 261.

NSSF 262 may select a set of network slice instances to serve a particular UE device 110, determine network slice selection assistance information (NSSAI), determine a particular AMF 220 to serve a particular UE device 110, and/or perform other types of processing associated with network slice selection or management. NSSF 262 may provide a list of allowed slices for a particular UE device 110 to UDM 252 to store in a subscription profile associated with the particular UE device 110. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to see if a PEI has been blacklisted. EIR 266 may be accessible via Neir interface 267.

NWDAF 268 may collect analytics information associated with radio access network 120 and/or core network 130. For example, NWDAF 268 may collect accessibility KPIs (e.g., an Radio Resource Control (RRC) setup success rate, a Radio Access Bearer (RAB) setup success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi access point (not shown in FIG. 2). N3IWF 274 may facilitate handovers for UE device 110 between radio access network 120 and the non-3GPP access device. N3IWF 274 maybe accessible via Nn3iwf interface 275.

As described herein, a PDU session may be established via UPF 230 for a selected slice and a communication may be made with AF 250 or server device 280 via UPF 230 for the selected slice. For example, AMF 220 for the selected slice may send a PDU session request to SMF 240 for the selected slice. SMF 240 for the selected slice may establish the PDU session with UPF 230 for the selected slice and send a response to AMF 220 for the selected slice. The AMF 220 for the selected slice may then send a PDU session establishment accept message to gNodeB 210, which in turn sends a RRC reconfiguration message to UE device 110, indicating the PDU session has been established. UE device 110 may then communicate with AF 250 (or server device 280) via the established PDU session.

Consistent with implementations described herein, power savings requests or configuration adjustments may be made via additional RRC messages exchanged between UE device 110 and wireless station 125 (e.g., gNodeB 210). During initial RRC configuration or reconfiguration, wireless station 125 may transmit an RRC message to UE device 110 that includes signaling radio bearer (SRB) configuration information as an information element (IE) in the message. In some embodiments, multiple SRBs may be identified, depending on whether the UE device is connected via EN-DC (E-UTRAN New Radio-Dual Connectivity) in which the UE device is connected to both an LTE eNodeB and a 5G gNodeB. Subsequent to RRC configuration and connection, UE 110 may transmit information regarding its status and other information using additional RRC signaling via the defined one or more SRBs. In one exemplary embodiment, UE device 110 may transmit requests for various power saving adjustments via one or more UE Assistance Information signaling messages. UE Assistance Information is defined by the 3GPP in the standard for both LTE and 5G NR as a variety of information that may be optionally transmitted by UE devices to wireless stations to inform the wireless network regarding capabilities, requests, and other information relating to the operation or proposed operation of the UE device. Examples of UE Assistance Information types include delay budget report information, overheating assistance information, in-device coexistence (IDC) information, and preference-related information regarding DRX parameters, maximum aggregated bandwidth, maximum number of secondary component carriers, maximum number of MIMO layers, minimum scheduling offset for cross-slot scheduling for power saving, provisioning with reference time information.

As described below in relation to FIG. 4, UE device 110 may initiate different types of information signaling based on its battery condition, which may be acted on by wireless station 125. The selection of an appropriate response by wireless station 125 may be based at least in part on the active slice(s) to which UE 110 is currently connected. In this manner, two or more distinct types of power savings requests may be transmitted by UE device 110 to wireless station 125. In response, wireless station 125 is configured to apply the requested mode changes based, at least in part, on the type of request and the active slice(s) to which UE device 110 is connected.

Although FIG. 2 shows exemplary components of core network 130, in other implementations, core network 130 may include fewer components, different components, differently arranged components, or additional components than depicted in FIG. 2. Additionally, or alternatively, one or more components of core network 130 may perform functions described as being performed by one or more other components of core network 130.

Figure 3:
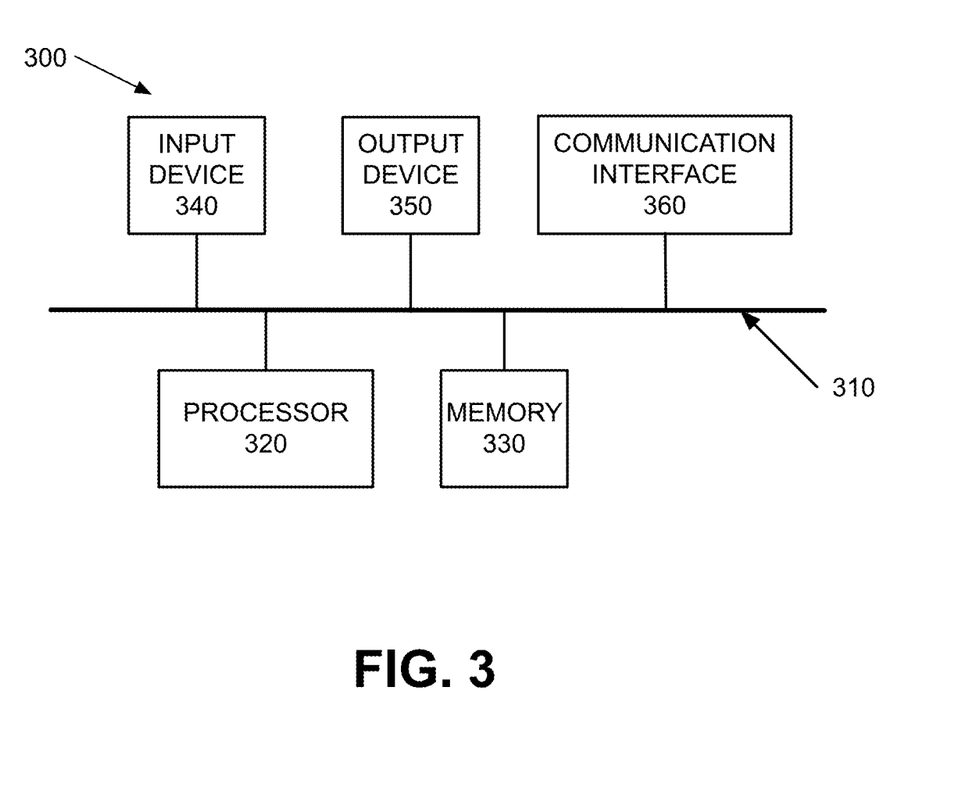
FIG. 3 is a diagram illustrating exemplary components of a device that may be included in a component according to an implementation described herein.

FIG. 3 illustrates example components of a device 300 according to an implementation described herein. UE device 110, gNodeB 210, AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, N3IWF 274, server device 280, and/or other components of core network 130 and/or data network 140, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the user. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to UE power savings mode configuration. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
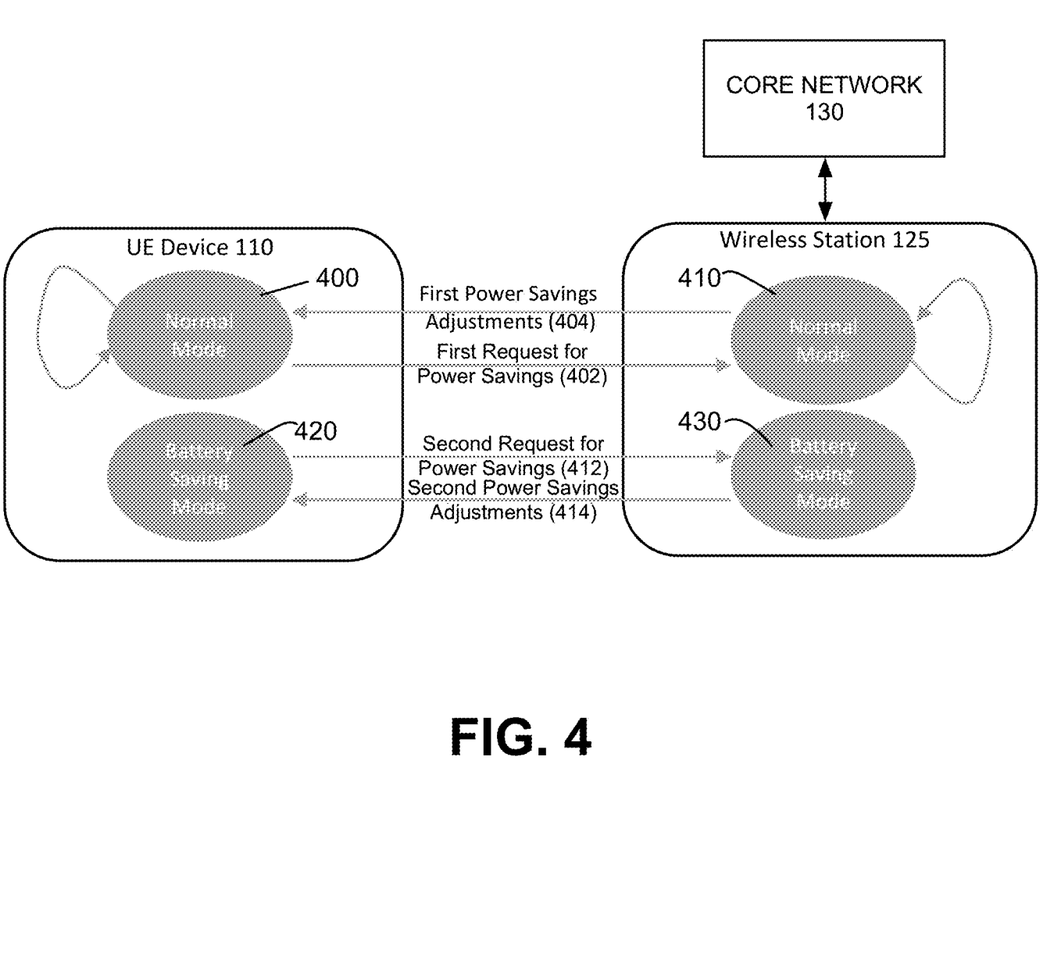
FIG. 4 illustrates a state diagram that depicts power-savings operational modes of the radio connection between a User Equipment (UE) device and a wireless station according to an implementation described herein.

FIG. 4 illustrates a state diagram that depicts the power-savings operational modes of the radio connection between UE device 110 and wireless station 125. As shown, UE device 110 operates in one of two power saving states, a first UE power saving state 400, denoted as Normal Mode, and a second UE power saving state 420, denoted as Battery Saving Mode. Similarly, wireless station 125 is configured to send responsive configuration information in a first wireless station (WS) power saving state 410 and a second WS power saving state 430.

When in first power saving state 400, UE device 110 may request various power savings adjustments, such as cell group limitations, bandwidth limitations, antenna limitations, DRX information, etc. (signal 402). As discussed above, such requests may be included within an RRC signaling message, such as within a UE Assistance Information message. Wireless station 125 (e.g., gNodeB 210), upon receipt of the request may determine which, if any of the requests to accommodate. For example, wireless station 125 may determine one or more network slices to which UE device 110 is actively connected. In some instances, information regarding the active network slices may be retrieved on demand, or periodically from core network 130. Network slices may include QoS-related requirements, such as latency maximums, jitter, throughput, packet loss, etc. Wireless station 125 may identify, which, if any of the adjustments corresponding to the power saving request are to be accommodated and enforced. For example, in some implementations, power saving requests from UE device 110 are discarded or modified in the event of an active low latency/jitter network slice. Wireless station 125 may then transmit the identified power saving configuration information to UE device 110 (signal 404). For example, wireless station 125 may transmit power saving configuration settings via an RRC reconfiguration message.

In other implementations, wireless station 125 may transmit a reconfiguration message that includes power-related configuration settings in an unsolicited manner. That is, wireless station 125 (or other components in RAN 120 or core network 130) may unilaterally determine to request reconfiguration of a radio connection with UE device into a first power saving state. Upon receipt of such an unsolicited request UE device 110 may determine whether or not to execute the reconfiguration based on the requirements of the active network slices to which it is connected.

UE device 110 transitions to second power saving state 420 when the stored energy in its battery falls below a predetermined percentage of battery capacity. For example, UE device 110 may enter second power saving state 420 when its battery level falls at or below 10%. In some implementations, this threshold may be user or carrier selectable. When in second power saving state 420, UE device 110 may transmit a second power savings request message (signal 412) to wireless station 125 regarding such condition. Consistent with implementations herein, second power savings request message 412 may indicate to wireless station 125 that selection of appropriate power saving configuration settings are not to be based on QoS (e.g., latency/jitter) requirements of the active network slice but should be configured and enforced to address a critical battery level. In other words, second power savings request message 412 effectively overrides the decision making process of wireless station 125 regarding if and when to make power saving-related adjustments to the radio connection(s) with UE device 110.

In some implementations, second power savings request message 412 may include a new type of IE that may be used in UE Assistance Information signaling. In other implementations, second power savings request message 412 may be transmitted using the OverheatingAssistance IE as defined in 3GPP. The OverheatingAssistance IE accommodates UE selection of any or all of a reduction in the maximum number of secondary component carriers; a reduction in the maximum bandwidth per frequency range for each of uplink and downlink; a reduction if the maximum number of MIMO layers per frequency range; reducing the maximum number of MIMO layers of each serving cell operating on each frequency range.

Upon receipt of second power savings request message 412, wireless station 125 identifies appropriate reconfiguration requirements based on the message and transmits a second power savings adjustment message 414 (e.g., an RRC reconfiguration message) to UE device 110 to enforce the changes included in the second power savings request message 412.

Figure 5A:
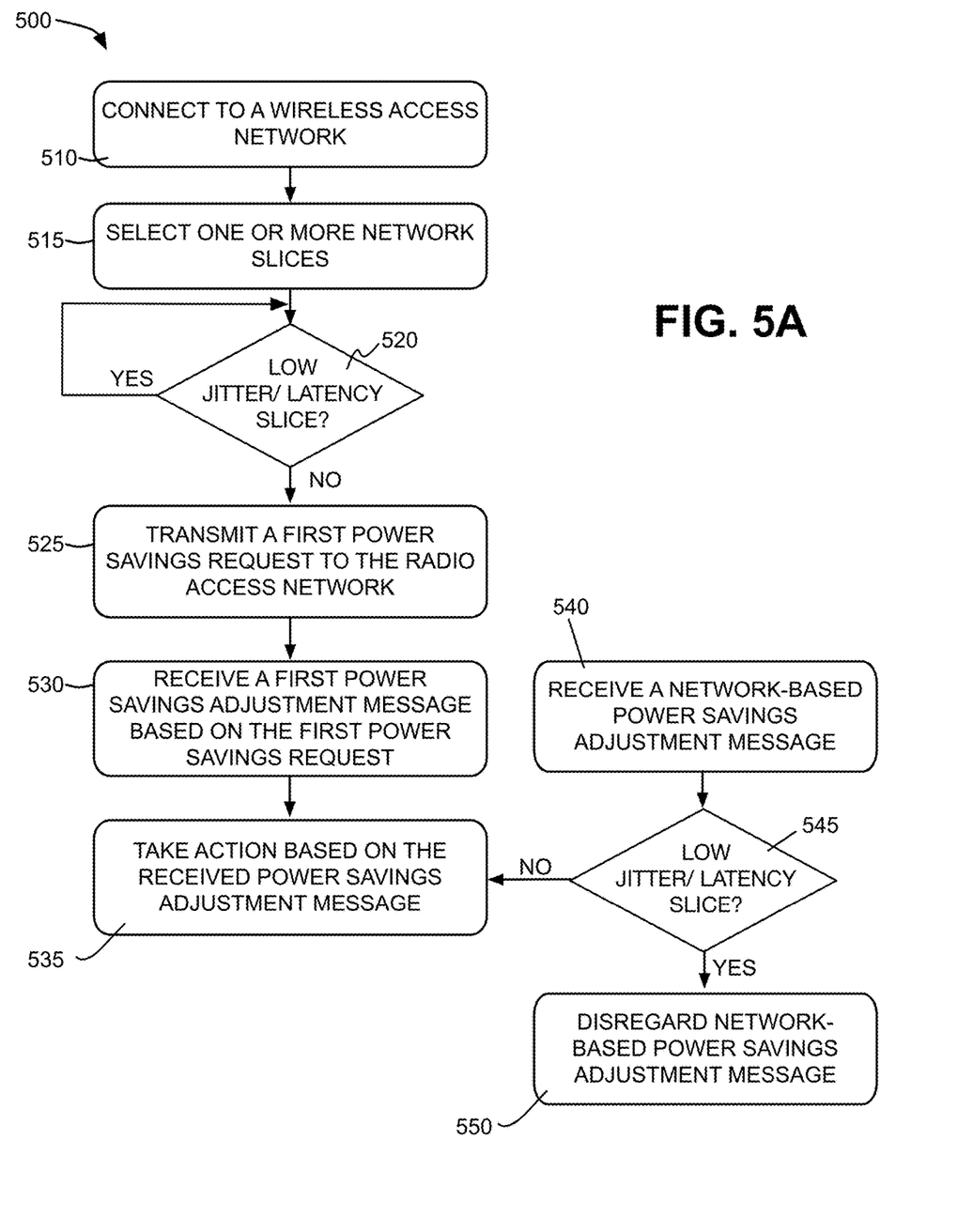
FIGS. 5A and 5B are flowcharts illustrating a process of enforcing power saving modes according to an implementation described herein.

FIG. 5A is a flowchart 500 illustrating a process of enforcing a first power saving mode according to an implementation described herein. In some implementations, the process of FIG. 5A may be performed by UE device 110. In other implementations, some or all of the process of FIG. 5A may be performed by another device or a group of devices separate from UE device 110, such as wireless station 125.

The process of FIG. 5A may initially include connecting to a wireless station in a radio access network (block 510). For example, UE device 110 may perform attachment to wireless station 125 using an RRC connection procedure. UE device 110 may select one or more network slices with which to communicate via the radio access network (block 515).

During its operation, UE device 110 may determine whether any active slices are low jitter/low latency slices (block 520). If so (block 520—YES), UE may return for a next monitoring cycle. However, if UE device 110 is not connected to at least one low jitter/low latency slice (block 520—NO), UE device 110 may transmit a normal mode power savings request message to the radio access network (block 525). For example, UE device 110 may transmit a first power savings request message 402 to wireless station 125 that indicates one or more connection configuration adjustments that may reduce UE power requirements to place the UE device into a first low power mode. Next, UE device 110 may receive a first power savings adjustment message 404 from the radio access network that accommodates and enforces one or more of the requested configuration adjustments (block 530). For example, UE device 110 receives a RRC reconfiguration message from wireless station 125 that modifies the radio connection based on the requested adjustments. In response, UE device 110 may take any appropriate action in response to the received power savings adjustment message (block 535).

As described above, in some embodiments, UE 110 may receive an unsolicited power-savings reconfiguration message from wireless station 125 (block 540). For example, capacity or other issues at wireless station 125 may cause it to attempt to reduce the capacity/configuration of connected UE devices by placing the UE device into the first low power mode. Upon receipt of such a network-based power savings adjustment message, UE device 110 may determine whether any active network slices include low jitter/low latency requirements (block 545). If so (block 545—YES), UE device 110 may disregard or otherwise modify the network-based power savings adjustment message (block 550). However, if it is determined that none of the active network slices are low jitter/low latency slices, processing continues to block 535 described above, in which appropriate action is taken at UE device 110 to execute the received adjustments.

As described above, a decision on whether to initiate reconfiguration based on the first power savings request message 402 may be based, at least in part, on the network slices to which UE device 110 is actively connected.

Figure 5B:
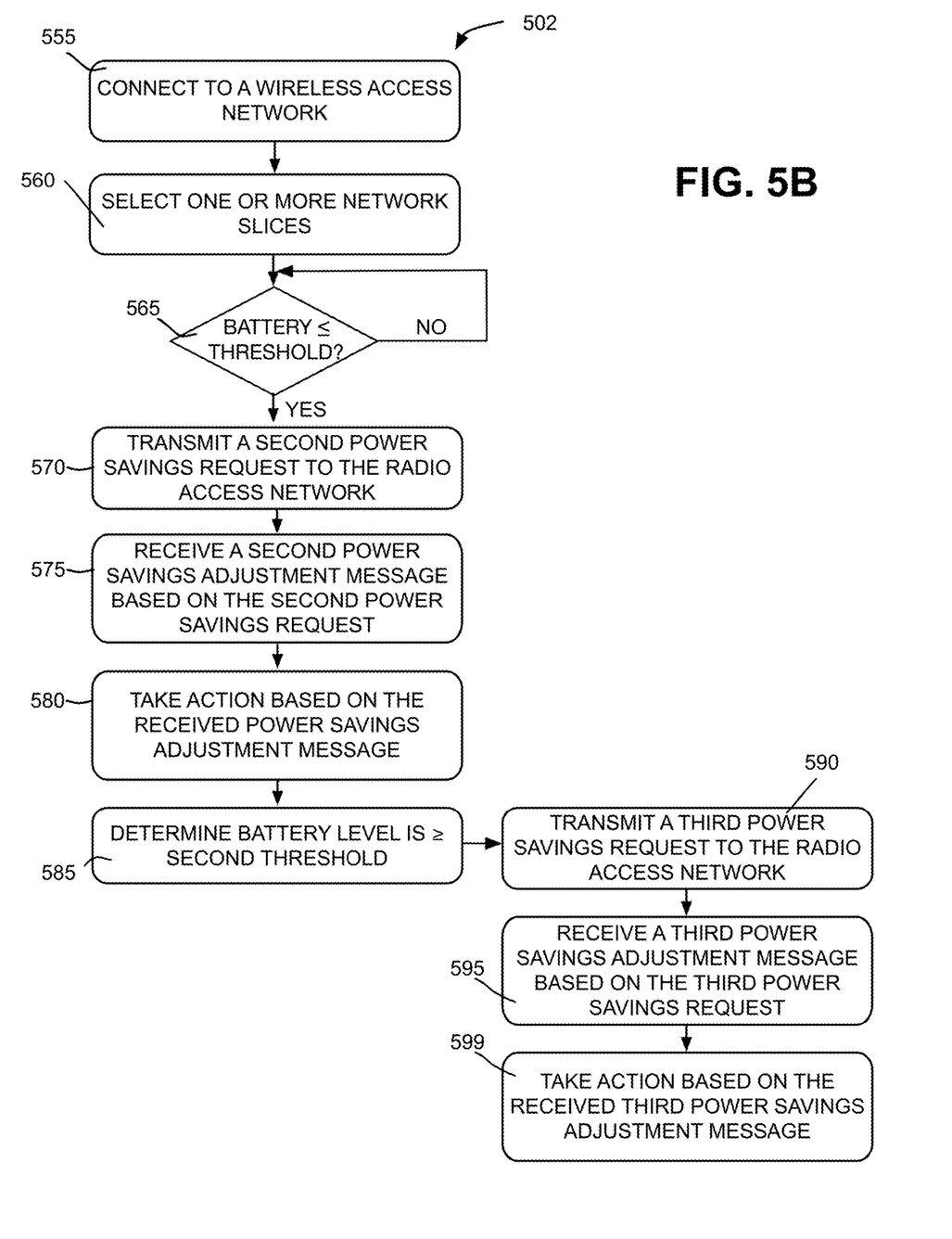

FIG. 5B is a flowchart 502 illustrating another process of enforcing a second power saving mode according to an implementation described herein. In some implementations, the process of FIG. 5B may be performed by UE device 110. In other implementations, some or all of the process of FIG.

5B may be performed by another device or a group of devices separate from UE device 110, such as wireless station 125.

Similar to process 500 described above in relation to FIG. 5A, the process of FIG. 5B may also initially include connecting to a wireless station in a radio access network (block 555) and selecting one or more network slices with which to communicate via the radio access network (block 560). At block 565, UE device 110 determines whether its battery level has fallen below a predetermined threshold (e.g., ≤10%). If not (block 565—NO), the process returns for a next monitoring interval. However, when it is determined that UE device 110's battery level has fallen below the predetermined threshold (block 565—YES), UE device 110 may transmit a second power savings request message to the radio access network (block 570). For example, UE device 110 may transmit a second power savings request message 412 to wireless station 125. The request indicates one or more connection configuration adjustments that may reduce UE power requirements.

As described above, second power savings request message 412 is of a different format than first power savings request message 402 and is thus handled differently that first power savings request message 402 by wireless station 125. UE device 110 may then receive a second power savings adjustment message 414 from the radio access network that accommodates the requested configuration adjustments identified in second power savings request message 412 (block 575). For example, UE device 110 receives a RRC reconfiguration message from wireless station 125 that modifies the radio connection based on the requested adjustments. In response, UE device 110 may take any appropriate action in response to the received second power savings adjustment message (block 580). As described above, a decision on whether to initiate reconfiguration based on the second power savings request message 412 is not based on the network slices to which UE device 110 is actively connected.

Next, when UE device 110 determines that its battery level has risen above a second predetermined threshold (e.g., ≥50%) (block 585). UE device 110 may then transmit a third low power mode power savings request message to the radio access network to remove the adjustments made in relation to the second third low power mode savings request (block 590). For example, UE device 110 may transmit a third power savings request message, to wireless station 125, which indicates that the one or more connection configuration adjustments identified in second low power mode savings request are to be removed. UE device 110 may then receive a third power savings adjustment message (e.g., another RRC reconfiguration message) from the radio access network that effectively removes the adjustments implemented upon receipt of the second power savings request message (block 595). In response, UE device 110 may take any appropriate action in response to the received third power savings adjustment message (block 599).

Figure 6A:
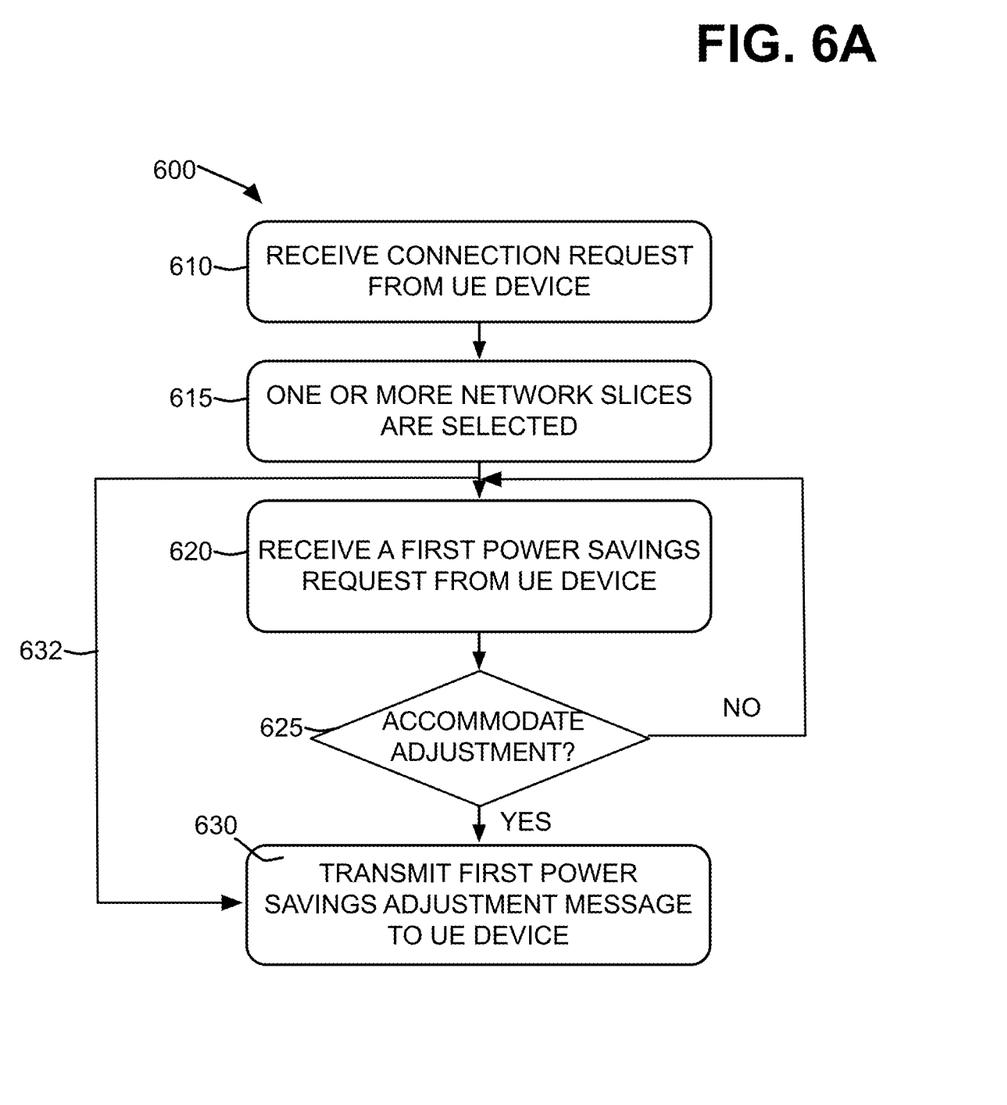
FIGS. 6A and 6B are flowcharts illustrating another process of enforcing power saving modes according to an implementation described herein.

FIG. 6A is a flowchart 600 illustrating another process of enforcing a first power saving mode according to an implementation described herein. In some implementations, the process of FIG. 6A may be performed by wireless station 125. In other implementations, some or all of the process of FIG. 6A may be performed by another device or a group of devices separate from wireless station 125, such as UE device 110, or components of core network 130.

The process of FIG. 6A may include receiving a connection request from a UE device (block 610). For example, wireless station 125 may receive an attachment request from a UE device 110 and may perform attachment using an RRC connection procedure. Wireless station may identify one or more network slices selected for communications between core network 130 and UE device 110 via the radio access network (block 615). A normal mode power savings request message may be received (block 620). For example, wireless station 125 may receive a first power savings request message 402 that indicates one or more connection configuration adjustments that may reduce UE power requirements. A determination regarding whether to accommodate any or all of the requested configuration adjustments may be made (block 625). For example, wireless station 125 may determine whether to accommodate power saving configuration adjustments based on requirements (e.g., QoS requirements) associated with the one or more network slices.

When it is determined that no accommodation is to be made (block 625—NO), such as when wireless station 125 determines that currently active network slices would be adversely affected by the requested adjustments, the process returns for a next request interval. However, when it is determined that at least one configuration adjustment is to be made based on the low power mode request message (block 625—YES), a first power savings adjustment message is transmitted to the UE device to accommodates and enforces one or more of the requested configuration adjustments (block 630). For example, wireless station 125 transmits a RRC reconfiguration message that modifies the radio connection based some or all of the requested adjustments.

As described above, in some embodiments, wireless station 125 may transmit an unsolicited power-savings reconfiguration message to UE 110 (indicated by arrow 632). For example, capacity or other issues at wireless station 125 may cause it to attempt to reduce the capacity/configuration of connected UE devices.

Figure 6B:
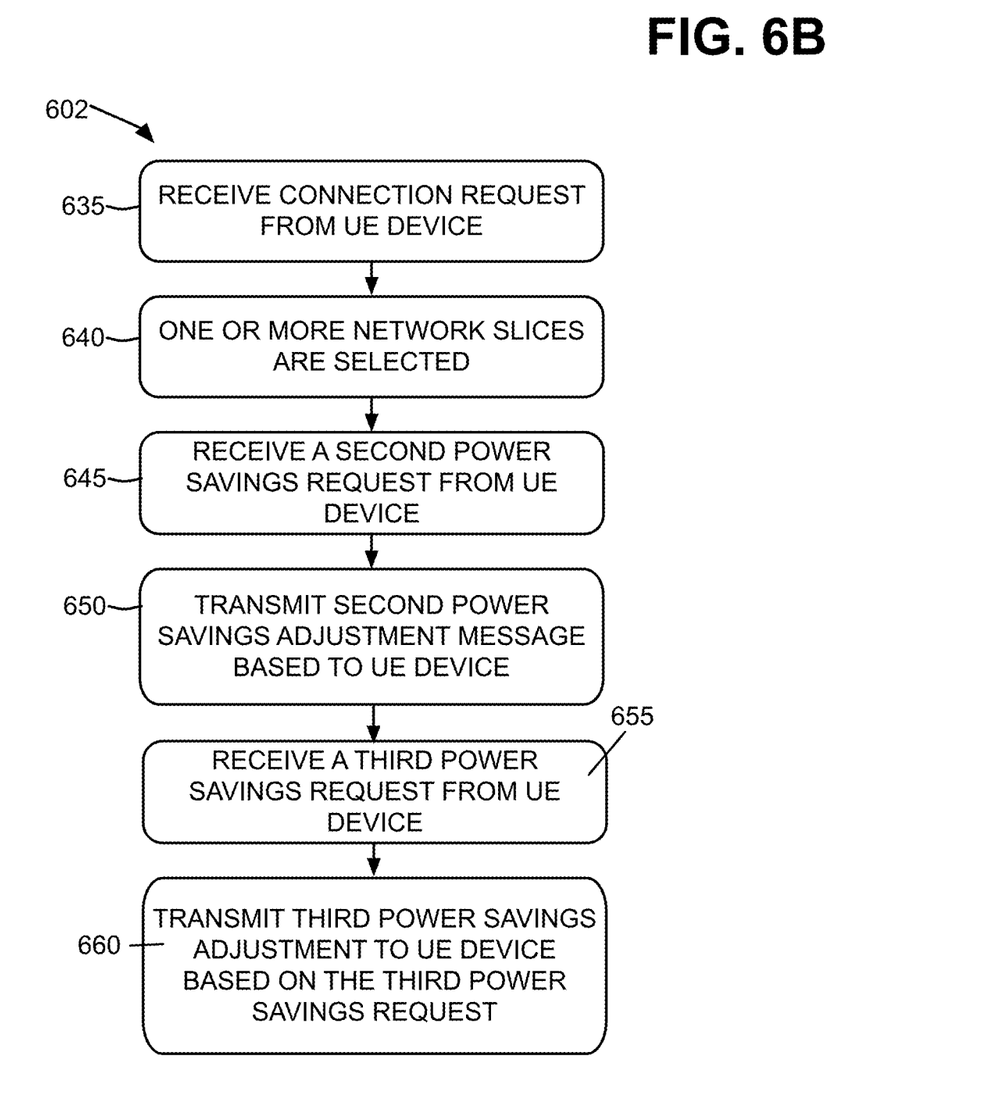

FIG. 6B is a flowchart 602 illustrating another process of enforcing a second power saving mode according to an implementation described herein. In some implementations, the process of FIG. 6B may be performed by wireless station 125. In other implementations, some or all of the process of FIG. 6B may be performed by another device or a group of devices separate from wireless station 125, such as components of core network 130.

Similar to process 600 described above in relation to FIG. 6A, the process of FIG. 6B may also initially include receiving a connection request from a UE device (block 635) and identifying network slices selected for communications between core network 130 and UE device 110 via the radio access network (block 640). Next, a second low power mode power savings request message is received (block 645). For example, wireless station 125 may receive a second power savings request message 412 that indicates one or more connection configuration adjustments that may reduce UE power requirements. As described above, second power savings request message 412 is of a different format than first power savings request message 402 and is thus handled differently than first power savings request message 402.

In response, a second power savings adjustment message 414 is generated and transmitted to UE device 110 that accommodates and enforces the requested configuration adjustments identified in second power savings request message 412 (block 650). For example, wireless station 125 generates and transmits an RRC reconfiguration message to UE device 110 that modifies the radio connection based on the requested adjustments. As described above, a decision on whether to initiate reconfiguration based on the second power savings request message 412 is not based on the network slices to which UE device 110 is actively connected.

A third low power mode power savings request message is received (block 655). For example, a third power savings request message may be received from UE device 110. The message indicates that the one or more connection configuration adjustments identified in second low power mode savings request are to be removed. A third power savings adjustment message is then generated and transmitted to UE device 110 (block 660). For example, wireless station 125 generates and transmits another RRC reconfiguration message to UE device that effectively reverses the adjustments made via second power savings adjustment message 414.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of signals has been described with respect to FIG. 4 and a series of blocks have been described with respect to FIGS. 5A, 5B, 6A, and 6B, the order of the signals and/or blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   connecting, by a user equipment (UE) device, to one or more network slices via a radio access network;
   receiving, by the UE device, a first reconfiguration message from a wireless station of the radio access network to attempt to place the UE device into a first power saving state;
   determining, by the UE device, whether any active network slices of the one or more network slices include low latency/jitter-related performance requirements;
   executing adjustments included in the first reconfiguration message to place the UE device into the first power saving state when it is determined that no active network slice includes low latency/jitter-related performance requirements;
   determining, by the UE device, that a battery level is below a first predetermined threshold;
   transmitting, by the UE device, a second power savings request to place the UE device into a second power saving state when it is determined that the battery level is below the first predetermined threshold and that at least one active network slice includes the low-latency/jitter-related performance requirements;
   receiving, by the UE device, a second reconfiguration message from the wireless station based on the second power savings request; and
   executing, by the UE device, adjustments included in the second reconfiguration message to place the UE device into the second power saving state.

2. The method of claim 1,
   discarding the first reconfiguration message when it is determined that at least one of the active network slices include low latency/jitter-related performance requirements.

3. The method of claim 1,
   transmitting, by the UE device, a first power savings request to the wireless station, wherein the first power savings request includes one or more accommodation requests,
   wherein the first power savings request is different than the second power savings request;
   receiving, by the UE device, the first reconfiguration message from the wireless station based on the first power savings request when the wireless station determines to accommodate some or all of the accommodation requests in the first power savings request; and executing, by the UE device, adjustments included in the first reconfiguration message to place the UE device into the first power saving state.

4. The method of claim 3, wherein the first power savings request comprises a first type of UE Assistance Information message and wherein the second power savings request comprises a second type of UE Assistance Information message.

5. The method of claim 4, wherein the second type of UE assistance information comprises an Overheating Assistance information element that identifies one or more network connection characteristics to be adjusted.

6. The method of claim 3, wherein the first power savings request and the second power savings request comprise radio resource control (RRC) signaling messages transmitted via a signaling radio bearer (SRB).

7. The method of claim 1, wherein the first predetermined threshold comprises about 10% of total battery capacity.

8. The method of claim 1, further comprising:
receiving the first predetermined threshold from a user of the UE device.

9. The method of claim 1, further comprising:
determining, by the UE device, that the battery level is above a second predetermined threshold;
transmitting, to the wireless station and by the UE device, a third power savings request to deactivate or reverse a reconfiguration resulting from the second reconfiguration message when it is determined that the battery level is above the second predetermined threshold; and
receiving, by the UE device, a third reconfiguration message from the wireless station based on the third power savings request.

10. A user equipment (UE) device comprising:
a memory storing instructions; and
a processor configured to execute the instructions to:
connect to one or more network slices via a radio access network;
receive a first reconfiguration message from a wireless station of a radio access network to attempt to place the UE device into a first power saving state;
determine whether any active network slices of the one or more network slices include low latency/jitter-related performance requirements;
execute adjustments included in the first reconfiguration message to place the UE device into the first power saving state when it is determined that no active network slices include low latency/jitter-related performance requirements;
determine that a battery level is below a first predetermined threshold;
transmit, to the wireless station, a second power savings request to place the UE device into a second power saving state when it is determined that the battery level is below the first predetermined threshold and that at least one active network slice includes the low-latency/jitter-related performance requirements;
receive a second reconfiguration message from the wireless station based on the second power savings request; and
execute adjustments included in the second reconfiguration message to place the UE device into the second power saving state.

11. The UE device of claim 10, wherein the processor is further configured to:
discard the first reconfiguration message when it is determined that at least one of the active network slices include low latency/jitter-related performance requirements.

12. The UE device of claim 10, wherein the processor is further configured to:
transmit a first power savings request to the wireless station, wherein the first power savings request includes one or more accommodation requests,
wherein the first power savings request is different than the second power savings request;
receive the first reconfiguration message from the wireless station based on the first power savings request when the wireless station determines to accommodate some or all of the accommodation requests in the first power savings request; and
execute adjustments included in the first reconfiguration message to place the UE device into the first power saving state.

13. The UE device of claim 12, wherein the first power savings request comprises a first type of UE Assistance Information message and wherein the second type of UE assistance information comprises an Overheating Assistance information element that identifies one or more network connection characteristics to be adjusted.

14. The UE device of claim 12, wherein the first power savings request and the second power savings request comprise radio resource control (RRC) signaling messages transmitted via a signaling radio bearer (SRB).

15. The UE device of claim 10, wherein the first predetermined threshold comprises about 10% of total battery capacity.

16. The UE device of claim 10, wherein the processor is further configured to:
determine that the battery level is at or above a second predetermined threshold;
transmit, to the wireless station, a third power savings request to deactivate or reverse a reconfiguration resulting from the second reconfiguration message when it is determined that the battery level is above the second predetermined threshold; and
receive a third reconfiguration message from the wireless station based on the third power savings request.

17. A system comprising:
a wireless station of a radio access network configured to:
provide at least one connection to a user equipment (UE) device based on one or more network slices;
receive a first power savings request from the UE device;
determine whether any active network slices of the one or more network slices include low latency/jitter-related performance requirements;
generate and transmit a first reconfiguration message when the wireless station determines that the no active network slice includes the low latency/jitter-related performance requirements to attempt to place the UE device into a first power saving state;
receive a second power savings request from the UE device indicating that a battery level of the UE device is below a first predetermined threshold, to place the UE device into a second power saving state,
automatically generate a second reconfiguration message in response to the second power savings request; and transmit the second reconfiguration message to the UE device.

18. The system of claim 17, wherein the wireless station is further configured to:
   generate and transmit the first reconfiguration message when the wireless station determines that the one or more network slices do not include low latency/jitter-related performance requirements.

19. The system of claim 17, wherein the wireless station is configured to:
   receive a third power savings request from the UE device indicating that the battery level is above a second predetermined threshold; and
   generate and transmit a third reconfiguration message to the UE device based on the third power savings request.

* * * * *